United States Patent
Ning et al.

(10) Patent No.: US 11,293,076 B2
(45) Date of Patent: Apr. 5, 2022

(54) METHOD FOR PREPARING IRON ORE CONCENTRATES BY RECYCLING COPPER SLAG TAILINGS

(71) Applicant: Kunming University of Science and Technology, Kunming (CN)

(72) Inventors: Ping Ning, Kunming (CN); Xueqian Wang, Kunming (CN); Lei Tao, Kunming (CN); Langlang Wang, Kunming (CN)

(73) Assignee: Kunming University of Science and Technology, Kunming (CN)

( * ) Notice: Subject to any disclaimer, the term of this patent is extended or adjusted under 35 U.S.C. 154(b) by 266 days.

(21) Appl. No.: 16/822,141

(22) Filed: Mar. 18, 2020

(65) Prior Publication Data

US 2020/0332390 A1 Oct. 22, 2020

(30) Foreign Application Priority Data

Apr. 16, 2019 (CN) .......................... 201910302981.8

(51) Int. Cl.
*B01D 53/50* (2006.01)
*B01D 53/78* (2006.01)
*B03B 7/00* (2006.01)
*C22B 1/02* (2006.01)
*C22B 7/00* (2006.01)
*C22B 7/04* (2006.01)

(52) U.S. Cl.
CPC ............ *C22B 7/006* (2013.01); *B01D 53/502* (2013.01); *B01D 53/78* (2013.01); *B03B 7/00* (2013.01); *C22B 1/02* (2013.01); *C22B 7/04* (2013.01); *B01D 2258/0283* (2013.01)

(58) Field of Classification Search
CPC .............. B01D 53/80; B01D 53/78; B01D 2258/0283; B01D 53/502; B01D 2251/60; B01D 53/50; C22B 1/11; C22B 7/04; C22B 15/0091; C22B 7/007; C22B 15/0071; C22B 1/02; C22B 7/006; Y02P 10/20; B03B 7/00
See application file for complete search history.

(56) References Cited

U.S. PATENT DOCUMENTS

| | | | | | |
|---|---|---|---|---|---|
| 1,822,588 | A | * | 9/1931 | Fowler | C22B 7/04 423/48 |
| 4,717,419 | A | * | 1/1988 | Makinen | C22B 7/04 75/623 |
| 11,220,725 | B2 | * | 1/2022 | Jalbout | C22B 15/0071 |

FOREIGN PATENT DOCUMENTS

| CN | 107 213 774 A | * | 9/2017 | .......... B01D 53/502 |
| CN | 109 082 534 A | * | 12/2018 | ............. C01B 17/74 |
| CN | 109 136 585 A | * | 1/2019 | .......... B01D 53/508 |
| CN | 111 500 869 A | * | 8/2020 | ............... C22B 1/11 |

* cited by examiner

*Primary Examiner* — Timothy C Vanoy
(74) *Attorney, Agent, or Firm* — Arent Fox LLP; Michael Fainberg

(57) ABSTRACT

The present invention discloses a method for preparing iron ore concentrates by recycling copper smelting slag tailings, and belongs to the technical field of metallurgy and tailings recycling. In the present invention, copper slag tailings obtained after copper pyrometallurgy and flotation and water are used as raw materials, and low-concentration sulfur dioxide flue gas is used as a leaching agent for leaching of metals such as iron, zinc, copper, arsenic, and silicon in the slag tailings; the leachate is purified step by step through processes such as replacement by metal iron powder and sulfide precipitation control, to separate zinc, copper, arsenic, etc.; a purified solution is mainly composed of $FeSO_4$ or can be used for producing a ferric salt flocculant; obtained tailings are used to obtain iron ore concentrates through magnetic separation, and the obtained iron ore concentrates can be used for further producing ultra-pure iron ore concentrates.

5 Claims, No Drawings

METHOD FOR PREPARING IRON ORE CONCENTRATES BY RECYCLING COPPER SLAG TAILINGS

CROSS-REFERENCE TO RELATED APPLICATIONS

This application claims priority to Chinese Patent Application No. 201910302981.8 filed on Apr. 16, 2019, the entire contents of which is hereby incorporated by reference.

FIELD OF TECHNOLOGY

The present invention relates to a method for preparing iron ore concentrates by recycling copper smelting slag tailings, and belongs to the metallurgy field and the tailings recycling field.

BACKGROUND

Copper slag tailings are industrial solid waste residue finally produced after flotation of copper matte slag is conducted for copper extraction in a copper smelting process. There are rich copper tailings with a total amount second only to that of iron tailings. In 2017, China has cumulatively produced 8.889 million tons of refined copper, and the number is still increasing. Approximately 80% of copper smelting enterprises use the pyrometallurgy process, and approximately 1-2 tons of copper slag tailings are produced when every 1 ton of copper is produced on average. Therefore, the annual amount of copper slag tailings in China is 711-14222 t/a. The copper slag tailings have complex components, high hardness, and fine particles, and contain valuable metals such as iron, zinc, and copper and a small quantity of heavy metals such as arsenic. Main valuable metal elements include the following by mass percent: Fe 40-50%, Si 10-15%, Ca 2-3%, Zn 1-2%, Al 1-2%, Cu 0.1-0.3%, and As 0.05%-0.02%. When improper treatment is conducted, a waste of resources and potential secondary environmental pollution will be caused.

Existing recycling modes of copper slag tailings mainly focus on recycling of valuable metals and inorganic minerals, goaf backfilling, preparation of roadbed materials, soil improvement, and the application in building raw materials such as cement, ceramics, and energy-saving wall bricks. The patent numbered CN201811037827.4 discloses a method for alkaline modification and low-temperature sulfuration reduction of copper-containing tailings. In the method, a copper matte phase and metal iron powder in copper-containing tailings are recovered by alkali salt roasting, sulfuration reduction, and magnetic separation. However, in the invention, high-temperature roasting needs to be conducted, and a large amount of alkali is required during the leaching. Therefore, operating costs are relatively high, and the application range is limited. The patent numbered CN201510250057.1 discloses a process for recycling copper, iron, and garnet from copper tailings. The method improves resource utilization of metallurgy waste residue by ore grinding, flotation, and magnetic separation. However, the invention has a relatively complex process, and needs to consume a large amount of combined inhibitors and combined collecting agents. Therefore, the invention relatively high costs. The patent numbered CN201510995464.5 discloses a method for preparing a ceramic material by using copper tailings. In the method, industrial solid wastes are recycled on a large scale, achieving relatively high environmental benefits and social benefits. However, the sintering temperature reaches 1000° C., and therefore the method has relatively high costs. The patent numbered CN201710833815.1 discloses a soilless culture substrate using waste copper tailings rock and a preparation method thereof. The method realizes rational utilization of the waste copper tailings rock. However, to avoid heavy metal pollution of plants, a liquid heavy metal bioremediation agent imported from the United States needs to be consumed for heavy metal pollution control. Moreover, the invention has a relatively long preparation cycle.

Iron in copper slag tailings mainly exists in forms of fayalite ($Fe_2SiO_4$) and magnetite ($Fe_3O_4$). Because a large number of vitreous structures are embedded on the surface of the copper slag tailings, it is difficult to efficiently separate fayalite from magnetite at low costs by using a conventional magnetic separation process. Usually, reduction roasting and magnetic separation are conducted. The patent numbered CN201710917697.2 discloses a copper slag treatment method. In the method, copper slag is mixed with a reducing agent, an additive, a binder, etc., and steps such as reduction roasting, crushing, screening, and magnetic separation are conducted, to separate copper, lead, and zinc in the copper slag, realizing comprehensive utilization of the copper slag. However, in the method, a large amount of the reducing agent is required; roasting is conducted two times; and the roasting temperature is relatively high (greater than 1000° C.). Therefore, the method has relatively high costs. In addition, the raw material contains harmful elements such as S and As. If it is directly used as a raw material for iron smelting, an obtained product usually has relatively poor quality and a low market value, and a waste of valuable metals will be caused. Therefore, currently, there is no method for efficiently preparing iron ore concentrates at low costs through magnetic separation based on copper slag tailings.

SUMMARY

Based on the problem existing in the recycling of copper slag tailings, the present invention provides a comprehensive utilization method for recovering iron ore concentrates based on copper slag tailings. In the present invention, low-concentration $SO_2$ flue gas is introduced into slurry prepared by copper slag tailings and water for reaction; during the reaction, Fe in iron silicate and trace metal elements such as Cu, Zn, and Mn in metal carbonates in the tailings are leached out efficiently; low-concentration sulfur dioxide in a gas phase is removed through liquid phase catalytic oxidation; a solution obtained after the reaction on the slurry is filtered, and the filtrate is subject to processes such as replacement by metal iron powder and sulfide precipitation control to purify the leachate step by step, to separate zinc, copper, arsenic, etc.; a purified solution is mainly composed of $FeSO_4$ and can be directly used for water treatment in enterprises or used for producing a ferric salt flocculant; and obtained tailings are used to obtain iron ore concentrates through magnetic separation, and the obtained iron ore concentrates can be used for further producing ultra-pure iron ore concentrates. In the present invention, based on a conventional acid leaching and magnetic separation process, low-concentration $SO_2$ is used to replace an acidic leaching agent, tailings obtained after the leaching are subject to magnetic separation, and Cu, Zn, Mn, etc. in slag tailings are leached out efficiently. The present invention has a simple process, resolves the problems of current solid waste treatment and flue gas purification in copper smelting plants, and provides an environmentalfriendly, economical, and efficient method. Moreover, in the present invention, copper slag tailings are used for preparing iron ore concentrates, realizing the recycling of the copper slag tailings. The present invention is achieved by the following technical solutions:

The method for preparing iron ore concentrates from copper slag tailings in the method includes the following specific steps:

(1) Acid Leaching of Copper Slag Tailings

Slurry with a solid-to-liquid ratio g:mL of 1:3-1:8 is prepared by the copper slag tailings and water, to purify flue gas from a refining furnace or collected environmental smoke by a primary or secondary desulphurization device, where the flue gas is $SO_2$ flue gas with a $SO_2$ concentration of 100-1000 mg/m$^3$; and the slurry is discharged when a concentration of $SO_2$ at a flue gas outlet is greater than 100 mg/m$^3$, and filtering is conducted, where the obtained filtrate is further purified for recycling, and the filter residue is subject to magnetic separation;

the copper slag tailings have the following main components by mass percent: Fe 40-50%, Si 10-15%, Ca 1.5-3%, Zn 1-2%, Al 1-2%, Cu 0.1-0.3%, and As 0.05-0.15%; and the volume content of $O_2$ in the flue gas from a refining furnace or collected environmental smoke is 12-21%, and the flue gas temperature is 20-100° C.; and in the obtained filtrate, a concentration of $Fe^{2+}$ is 13-21 g/L, a concentration of $Fe^{3+}$ is 2-4 g/L, a concentration of $Zn^{2+}$ is 500-2000 mg/L, a concentration of $Cu^{2+}$ is 200-600 mg/L, a concentration of $As^{3+}$ is 40-500 mg/L, and a concentration of $H^+$ is 0.2-1.0 g/L.

(2) Recovery of Copper from a Desulfurized Solution

The filtrate is introduced into a replacement device; iron powder is added to the filtrate under stirring at room temperature to 80° C. at 20-200 rpm, where an addition amount of the iron powder is 2-5 times of a theoretical amount thereof required for replacement of $Cu^{2+}$ and $Fe^{3+}$; replacement reaction is conducted for 30-120 min; and solid-liquid separation is conducted, to obtain copper-containing slag and replacement liquid; and a particle size of the iron powder is 45-100 μm (40-200 meshes), and the mass content of iron in the iron powder is greater than 98%; the copper content of the copper-containing slag is 40-60%; and in the filtrate, a concentration of $Fe^{2+}$ is 15-25 g/L, a concentration of $Zn^{2+}$ is 500-2000 mg/L, a concentration of $As^{3+}$ is 40-500 mg/L, and a concentration of $H^+$ is 0.2-1.0 g/L.

(3) Purification of the Replacement Liquid and Recycling of Iron-Containing Slurry A sulfiding agent is added to the replacement liquid for precipitation of zinc and arsenic ions in the solution to obtain sulfide precipitates, so as to obtain zinc-containing slag and iron-containing slurry, where an addition amount of the sulfiding agent is 3-8 times of a theoretical amount thereof required for precipitation of the zinc and arsenic ions; and the iron-containing slurry is used for further producing a ferric salt flocculant; and the sulfiding agent is ferrous sulfide or sodium sulfide, a particle size of the ferrous sulfide is 37-150 μm (100-400 meshes), and the mass content of an effective sulfur component is greater than 35%; the zinc content of the obtained zinc-containing slag is 10-50%; and in the filtrate, a concentration of $Fe^{2+}$ is 15-25 g/L, and a concentration of $H^+$ is 0.2-1.0 g/L.

(4) Magnetic Separation of Desulfurized Slag

The filter residue in step (1) is placed in a wet magnetic separation device, magnetic separation is conducted in a magnetic field with intensity of 0.05-0.2 T to obtain rough iron ore concentrates and tailings, the tailings are returned along an original route of a slag dump for treatment, and magnetic separation can be further conducted on the rough iron ore concentrates to obtain iron ore concentrates.

In the present invention, gas-liquid-solid three phases are involved, and desulfurization, acid leaching, liquid phase catalytic oxidation, etc. are conducted. Main reaction equations are as follows:

When $SO_2$ is dissolved in water, the following reaction occurs:

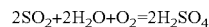
$2SO_2+2H_2O+O_2=2H_2SO_4$

Leaching reactions of slag tailings in an acidic condition are as follows:

$Fe_2SiO_4+2H_2SO_4=2FeSO_4+SiO_2\downarrow+2H_2O$ $CuO+H_2SO_4=CuSO_4+H_2O$ $ZnO+H_2SO_4=ZnSO_4+H_2O$

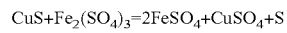
$CuS+Fe_2(SO_4)_3=2FeSO_4+CuSO_4+S$

Liquid phase catalytic oxidation reactions between $SO_2$ and metal ions are as follows:

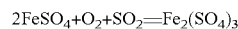
$2FeSO_4+O_2+SO_2=Fe_2(SO_4)_3$

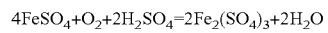
$4FeSO_4+O_2+2H_2SO_4=2Fe_2(SO_4)_3+2H_2O$ $2SO_2+O_2+2H_2O \xrightarrow{\text{Metal ion}} 2H_2SO_4$ After the reactions are conducted in the acidic condition, the slurry is separated to obtain leach residue and leachate. The leachate contains a relatively large quantity of iron ions, zinc ions, copper ions, and other metal ions. Purification processes such as replacement and precipitation can be conducted to recover copper in a desulfurized solution and iron from the leachate. Magnetic separation is conducted on the leach residue to obtain iron ore concentrates and tailings.

The present invention has the following advantages and beneficial effects:

(1) In the method, low-concentration $SO_2$ in flue gas is used to replace a sulfuric acid solution in a conventional leaching section; Fe, Cu, Zn, As, and Si in slag tailings are efficiently leached out; and the desulfurization efficiency is greater than or equal to 90%.

(2) In the method, acid leaching and recycling of copper slag tailings are integrated; the leaching process reduces the content of impurities such as silicon; enrichment and recovery of copper and zinc in the slag tailings are implemented; and iron salts in leachate can be recycled, and magnetic separation can be conducted on leach residue to obtain magnetic iron, thereby simplifying the process and reduce costs.

(3) The method can make modification based on a conventional desulfurization tower, and has simple devices and low energy consumption. Moreover, the method can reduce slag tailings by 30% and implement efficient recycling of the slag tailings by using low-concentration $SO_2$ in flue gas, thereby increasing economic benefits of enterprises.

DETAILED DESCRIPTION

The present invention is further described in detail below with reference to embodiments, but the protection scope of the present invention is not limited to the following embodiments.

Embodiment 1

In this embodiment, $SO_2$ cylinder gas with a purity of 1%, $N_2$ cylinder gas with a purity of 95%, and air extracted by an air pump were used to accurately prepare simulated flue gas from collected environmental smoke in copper smelting by a mass flowmeter, where a total flow rate was 1200 mL/min, a volume concentration of $O_2$ is 20%, a concentration of $SO_2$ is 600 mg/m$^3$; the flue-gas temperature is 25° C.; and copper slag tailings were from a copper smelting company in Yunnan and composed of the following main components by mass percent: Fe 43.10%, Si 13.6%, Ca 2.3%, Zn 1.4%, Al 1.5%, Cu 0.26%, and As 0.08%.

A method for preparing iron ore concentrates from copper slag tailing slurry includes the following:

(1) Slurry was prepared by the copper slag tailings and water at a solid-liquid ratio g:mL of 1:8, added to a 250 mL bubbling reactor, and kept at 25° C. at 200 rpm by using a magnetic stirrer; the prepared simulated flue gas from collected environmental smoke in copper smelting was introduced into the slurry, and held for 4 s; after reaction, flue gas was discharged after it reached the standard, where when the reaction lasted for 15 h, the outlet flue gas reached more than 100 mg/m$^3$; and the slurry was filtered to recover the filtrate, and the filter residue was collected.

(2) The filtrate was transferred to a replacement reactor, heated to 55° C., and mechanically stirred (50 rpm); 1.2 g/L reduced iron powder with a particle size of 45 μm and the iron mass content of 99% was added; and after reaction was conducted for 1 h, an obtained solution was filtered, where the filtrate was used in a next step, and the filter residue was mainly composed of copper and was recovered for sale.

(3) The filtrate in step (2) was added to a purification reactor, and mechanically stirred at normal temperature; 9.8 g/L commercially available FeS (effective S content is greater than 36%) with a particle size of 45 μm was added; and after reaction was conducted for 1 h, an obtained solution was filtered, where the filtrate was used in a next step, the filter residue was mainly composed of zinc sulfide and was recovered, and the filtrate was mainly composed of Fe $SO_4$.

(4) Slurry was prepared by water and the filter residue in step (1) with the mass content of 5%, slowly placed in a wet magnetic separator at normal temperature, and subject to magnetic separation in a magnetic field with intensity of 0.05 T to obtain rough iron ore concentrates and tailings; and the tailings was returned along an original route of a slag dump for treatment, and magnetic separation could be further conducted on the rough iron ore concentrates to obtain iron ore concentrates.

Through this process, the filter residue with the copper content of 45% was obtained by replacement; a concentration of $Fe^{2+}$ in the purified filtrate is 21 g/L; the yield of the iron ore concentrates obtained after magnetic separation is 26.40%; and in the iron ore concentrates, the content of iron is 50.81%, the content of Si is 5.16%, and the content of As is 0.07%, reaching the grade 5 standard of magnetic concentrate in the iron ore product standard (GB 32545-2016).

Embodiment 2

In this embodiment, $SO_2$ cylinder gas with a purity of 1%, $N_2$ cylinder gas with a purity of 95%, and air extracted by an air pump were used to accurately prepare simulated flue gas from a refining furnace in copper smelting by a mass flowmeter, where a total flow rate was 1200 mL/min, a volume concentration of $O_2$ is 19%, a concentration of $SO_2$ is 1000 mg/m$^3$; the flue-gas temperature is 25° C. Copper slag tailings were from a copper smelting company in Hunan and composed of the following main components by mass percent: Fe 48.60%, Si 12.6%, Ca 2.4%, Zn 1.3%, Al 1.4%, Cu 0.28%, and As 0.07%.

A method for preparing iron ore concentrates from copper slag tailing slurry includes the following:

(1) Slurry was prepared by the copper slag tailings and water at a solid-liquid ratio g:mL of 1:5, added to a 250 mL bubbling reactor, and kept at 30° C. at 300 rpm by using a magnetic stirrer; the prepared simulated flue gas from a refining furnace in copper smelting was introduced into the slurry, and held for 5 s; after reaction, flue gas was discharged after it reached the standard, where when the reaction lasted for 10 h, the outlet flue gas reached more than 100 mg/m$^3$; and the slurry was filtered to recover the filtrate, and the filter residue was collected.

(2) The filtrate was transferred to a replacement reactor, heated to 60° C., and mechanically stirred (100 rpm); 2.1 g/L reduced iron powder with a particle size of 60 μm and the iron mass content of 99% was added; and after reaction was conducted for 1 h, an obtained solution was filtered, where the filtrate was used in a next step, and the filter residue was mainly composed of copper and was recovered for sale.

(3) The filtrate in step (2) was added to a purification reactor, and mechanically stirred at normal temperature; 12.0 g/L commercially available sodium sulfide (effective S content is greater than 25.2%) was added; and after reaction was conducted for 1 h, an obtained solution was filtered, where the filtrate was used in a next step, the filter residue was mainly composed of zinc sulfide and was recovered, and the filtrate was mainly composed of $FeSO_4$.

(4) Slurry was prepared by water and the filter residue obtained in step (1) with the mass content of 8%, slowly placed in a wet magnetic separator at normal temperature, and subject to magnetic separation in a magnetic field with intensity of 0.1 T to obtain rough iron ore concentrates and tailings; and the tailings was returned along an original route of a slag dump for treatment, and magnetic separation could be further conducted on the rough iron ore concentrates to obtain iron ore concentrates.

Through this process, the filter residue with the copper content of 55% was obtained by replacement; a concentration of $Fe^{2+}$ in the purified filtrate is 20 g/L; the yield of the iron ore concentrates obtained after magnetic separation is 48.40%, and in the iron ore concentrates, the content of iron is 57.21%, the content of Si is 4.16%, and the content of As is 0.06%, reaching the grade 5 standard of magnetic concentrate in the iron ore product standard (GB 32545-2016).

Embodiment 3

In this embodiment, $SO_2$ cylinder gas with a purity of 1%, $N_2$ cylinder gas with a purity of 95%, and air extracted by an air pump were used to accurately prepare simulated mixed gas of flue gas from a refining furnace and flue gas from collected environmental smoke in copper smelting by a mass flowmeter, where a total flow rate was 1200 mL/min, a volume concentration of $O_2$ is 19.5%, a concentration of $SO_2$ is 800 mg/m³; the flue-gas temperature is 25° C.; and copper slag tailings were from a copper smelting company in Yunnan and composed of the following main components by mass percent: Fe 41.50%, Si 12.6%, Ca 2.8%, Zn 1.3%, Al 1.4%, Cu 0.28%, and As 0.09%.

A method for preparing iron ore concentrates from copper slag tailing slurry includes the following:

(1) Slurry was prepared by the copper slag tailings and water at a solid-liquid ratio g:mL of 1:3, added to a 250 mL bubbling reactor, and kept at 30° C. at 300 rpm by using a magnetic stirrer; the prepared simulated mixed gas of flue gas from a refining furnace and flue gas from collected environmental smoke in copper smelting was introduced into the slurry, and held for 6 s; after reaction, flue gas was discharged after it reached the standard, where when the reaction lasted for 15 h, the outlet flue gas reached more than 100 mg/m³; and the slurry was filtered to recover the filtrate, and the filter residue was collected.

(2) The filtrate was transferred to a replacement reactor, heated to 70° C., and mechanically stirred (150 rpm); 1.82 g/L reduced iron powder with a particle size of 75 μm and the iron mass content of 99% was added; and after reaction was conducted for 1 h, an obtained solution was filtered, where the filtrate was used in a next step, and the filter residue was mainly composed of copper and was recovered for sale.

(3) The filtrate in step (2) was added to a purification reactor, and mechanically stirred at normal temperature; 13.58 g/L commercially available FeS (effective S content is greater than 36%) with a particle size of 80 μm was added; and after reaction was conducted for 1 h, an obtained solution was filtered, where the filtrate was used in a next step, the filter residue was mainly composed of zinc sulfide and was recovered, and the filtrate was mainly composed of $FeSO_4$.

(4) Slurry was prepared by water and the filter residue obtained in step (1) with the mass content of 8%, slowly placed in a wet magnetic separator at normal temperature, and subject to magnetic separation in a magnetic field with intensity of 0.2 T to obtain rough iron ore concentrates and tailings; and the tailings was returned along an original route of a slag dump for treatment, and magnetic separation could be further conducted on the rough iron ore concentrates to obtain iron ore concentrates.

Through this process, the filter residue with the copper content of 58% was obtained by replacement; a concentration of $Fe^{2+}$ in the purified filtrate is 25 g/L; the yield of the iron ore concentrates obtained after magnetic separation is 48.40%, and in the iron ore concentrates, the content of iron is 51.21%, the content of Si is 4.36%, and the content of As is 0.06%, reaching the grade 5 standard of magnetic concentrate in the iron ore product standard (GB 32545-2016).

Embodiment 4

In this embodiment, flue gas was mixed gas of flue gas from a refining furnace and flue gas from collected environmental smoke in a copper smelting company in Yunnan, where a total flow rate was 1500 m³/h, a volume concentration of $O_2$ is 19.5%, a concentration of $SO_2$ is 1000 mg/m³, and the flue-gas temperature is 80° C. Copper slag tailings were from this company and composed of the following main components by mass percent: Fe 40.20%, Si 14.9%, Ca 1.4%, Zn 1.3%, Al 1.8%, Cu 0.29%, and As 0.13%.

A method for preparing iron ore concentrates from copper slag tailing slurry includes the following:

(1) Slurry was prepared by the copper slag tailings and water at a solid-liquid ratio g:mL of 1:4 in a slurry preparation tank, and was pumped into a spray-type desulfurization tower by a slurry pump; flue gas was discharged after being subject to reaction in the desulfurization tower, where when the reaction lasted for 15 h, the outlet flue gas reached more than 100 mg/m³; and filter pressing was conducted on the slurry in a circulating tank to recover the filtrate, and the filter residue was collected.

(2) The filtrate was transferred to a replacement reaction tank, heated to 80° C., and mechanically stirred (200 rpm); 3.5 g/L reduced iron powder with a particle size of 90 μm and the iron mass content of 99% was added; and after reaction was conducted for 1 h, an obtained solution was filtered, where the filtrate was used in a next step, and the filter residue was mainly composed of copper and was recovered for sale.

(3) The filtrate obtained in step (2) was added to a purification reactor, and mechanically stirred at normal temperature; 12.23 g/L commercially available FeS (effective S content is greater than 36%) with a particle size of 100 μm was added; and after reaction was conducted for 1 h, an obtained solution was filtered, where the filtrate was used in a next step, the filter residue was mainly composed of zinc sulfide and was recovered for sale, and the filtrate was mainly composed of $FeSO_4$.

(4) Slurry was prepared by water and the filter residue obtained in step (1) with the mass content of 8%, slowly placed in a wet magnetic separator at normal temperature, and subject to magnetic separation in a magnetic field with intensity of 0.1 T to obtain rough iron ore concentrates and tailings; and the tailings was returned along an original route of a slag dump for treatment, and magnetic separation could be further conducted on the rough iron ore concentrates to obtain iron ore concentrates.

Through this process, the filter residue with the copper content of 50% was obtained by replacement; a concentration of $Fe^{2+}$ in the purified filtrate is 22 g/L; the yield of the iron ore concentrates obtained after magnetic separation is 50.40%, and in the iron ore concentrates, the content of iron is 50.21%, the content of Si is 4.16%, and the content of As is 0.06%, reaching the grade 5 standard of magnetic concentrate in the iron ore product standard (GB 32545-2016).

The invention claimed is:

1. A method for preparing iron ore concentrates by recycling copper slag tailings, comprising the following steps:

(1) purifying and absorbing $SO_2$ flue gas with a $SO_2$ concentration of 100-1000 mg/m³ by using copper slag tailings slurry, discharging the slurry when a concentration of $SO_2$ at a flue gas outlet is greater than 100 mg/m³, and conducting filtering;

(2) adding iron powder to the filtrate under stirring at room temperature to 80° C., wherein an addition amount of the iron powder is 2-5 times of a theoretical amount thereof for replacement of $Cu^{2+}$ and $Fe^{3+}$; conducting replacement reaction for 30-120 min; and conducting solid-liquid separation, to obtain copper-containing slag and replacement liquid;

(3) adding a sulfiding agent to the replacement liquid for precipitation of zinc and arsenic ions, to obtain zinc-containing slag and iron-containing slurry, wherein an addition amount of the sulfiding agent is 3-8 times of a theoretical amount thereof for precipitation of the zinc and arsenic ions; and (4) placing the filter residue obtained in step (1) in a wet magnetic separation device, conducting magnetic separation in a magnetic field with intensity of 0.05-0.2 T to obtain rough iron ore concentrates and tailings, returning the tailings along an original route of a slag dump for treatment, and further conducting magnetic separation on the rough iron ore concentrates to obtain iron ore concentrates.

2. The method for preparing iron ore concentrates by recycling copper slag tailings according to claim 1, wherein the volume content of $O_2$ in the $SO_2$ flue gas is 12-21%, and the flue gas temperature is 20-100° C.

3. The method for preparing iron ore concentrates by recycling copper slag tailings according to claim 1, wherein a solid-to-liquid ratio of copper slag tailings to water in the copper slag tailings slurry is 1:3-1:8.

4. The method for preparing iron ore concentrates by recycling copper slag tailings according to claim 1, wherein a particle size of the iron powder is 45-100 μm, and the mass content of iron in the iron powder is greater than 98%.

5. The method for preparing iron ore concentrates by recycling copper slag tailings according to claim 1, wherein the sulfiding agent is ferrous sulfide or sodium sulfide, and a particle size of the ferrous sulfide is 37-150 μm.

* * * * *